May 15, 1945.  H. W. GILFILLAN  2,375,782
POWER TRANSMISSION
Filed Aug. 8, 1941

INVENTOR
Henry W. Gilfillan.
BY
ATTORNEYS.

Patented May 15, 1945

2,375,782

UNITED STATES PATENT OFFICE 2,375,782

POWER TRANSMISSION

Henry W. Gilfillan, Detroit, Mich., assignor to Chrysler Corporation, Highland Park, Mich., a corporation of Delaware Application August 8, 1941, Serial No. 406,030

4 Claims. (Cl. 123—179)

This invention relates to motor vehicles and refers more particularly to improvements in power transmission therefor.

In certain types of power transmission systems employing an overrunning drive and electrical control device it is sometimes impossible to start a "dead" engine by towing (pushing or pulling) the car where the usual storage battery has dropped in voltage to a point where it will not operate the electrical control. Such battery failure usually occurs in cold weather. One of such transmissions is arranged for a relatively slow speed one-way drive incorporating an overrunning control and a relatively fast speed two-way drive under control of an electrical device and arranged to bridge the one-way drive.

It is an object of my invention to provide means for effecting operation of the electrical device so that the engine may be started by towing in the event of a voltage drop in the battery.

In carrying out my invention, I provide a field coil for the electrical control device and a resistance so arranged that for normal operation of the transmission, the resistance is in series with the coil but for cold starting, where the battery voltage is down, the resistance is shunted out. Such arrangement furthermore accommodates the use of a larger coil than normal because of the resistance in series with the coil under normal conditions of maximum battery voltage.

Further objects and advantages of my invention reside in the novel combination and arrangement of parts more particularly hereinafter described and claimed, reference being had to the accompanying drawing in which:

Figure 1:
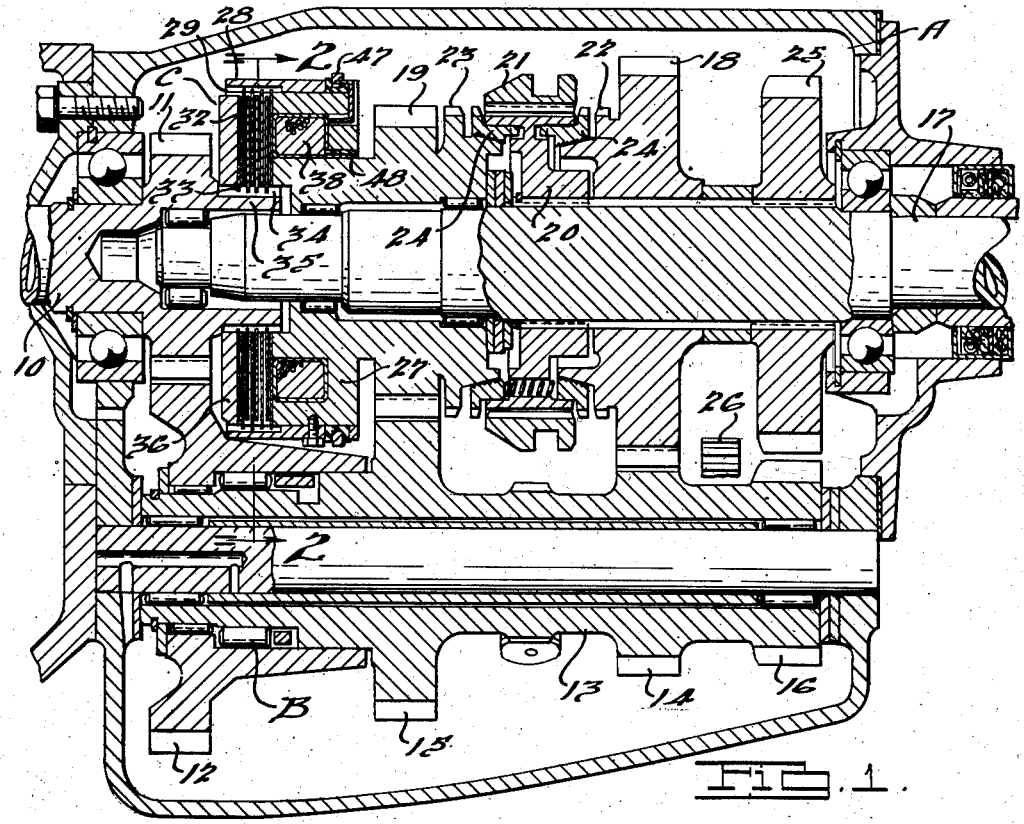
Fig. 1 is a longitudinal sectional elevational view through a typical transmission showing my invention incorporated therewith.

Referring to the drawing, I have illustrated my invention in connection with a transmission wherein one or more pairs of relatively engageable drive control elements are arranged to control a transmission drive, the drive control elements being in the form of a clutch and preferably of the frictionally engageable magnetically controlled type as will presently be more apparent.

Referring to the transmission A of Fig. 1, reference character 10 represents the driving shaft adapted to receive power from the usual vehicle engine, this shaft carrying the main drive pinion 11 which is in constant mesh with gear 12. This gear drives countershaft 13 through an overrunning clutch B of the usual type such that when shaft 10 drives in its usual clockwise direction (looking from front to rear) then clutch B will engage to lock gear 12 to countershaft 13 whenever gear 12 tends to drive faster than the countershaft. However, whenever this gear 12 tends to rotate slower than the countershaft then clutch B will automatically release whereby shaft 10, under certain conditions, may readily drop its speed while countershaft 13 continues to revolve.

Countershaft 13 comprises cluster gears 14, 15 and 16 which respectively provide drives in first, third and reverse. Freely rotatable on the driven or output shaft 17, which is axially aligned with shaft 10, are the first and third driven gears 18 and 19 respectively in constant mesh with countershaft gears 14 and 15. A hub 20 is splined on shaft 17 and carries therewith a shiftable sleeve 21 adapted for shift in any desired manner, such as manually, from the Fig. 1 neutral position either rearwardly to clutch with teeth 22 of gear 18 or else forwardly to clutch with teeth 23 of gear 19. If desired, toothed blocker synchronizer rings 24 may be located between sleeve 21 and teeth 22, 23 to insure shift of sleeve 21 only when the parts to be clutched are synchronized as is now well known and as set forth, for example, in the copending application of O. E. Fishburn, Serial No. 180,840 filed December 20, 1937, now Patent No. 2,333,165.

Shaft 17 also carries reverse driven gear 25 fixed thereto. A reverse idler gear 26 is suitably mounted so that when reverse is desired, idler 26 is shifted rearwardly into mesh with gears 16 and 25.

First, third and reverse speed ratio drives and neutral are preferably under manual shift control of the vehicle driver by manipulation of sleeve 21 or gear 26.

First is obtained by shifting sleeve 21 to clutch with teeth 22, the drive passing from pinion 11 to gear 12 thence through clutch B to countershaft 13. From the countershaft this drive is through gears 14, 18 and sleeve 21, hub 20 to shaft 17.

Third is obtained by shifting sleeve 21 forwardly to clutch with teeth 23, the drive passing from pinion 11 to countershaft 13 as before, thence through gears 15, 19 and sleeve 21 to shaft 17.

Reverse is obtained by shifting idler 26 into mesh with gears 16 and 25, sleeve 21 being in neutral, the reverse drive passing from shaft 10 to the countershaft 13 as before, thence through gears 16, 26 and 25 to shaft 17.

I have provided clutching means comprising an electromagnetic device C for operably connecting and disconnecting pinion 11 and gear 19 so as to step-up the speed ratio drive from first to second and from third to fourth which is a direct drive speed ratio. When driving in first, second is obtained by engaging clutch C, the drive then passing from pinion 11 through clutch C to gears 19 and 15 thence through countershaft 13 and gears 14, 18 to sleeve 21 and shaft 17, clutch B overrunning. By similar operation, the drive may be stepped up from third to direct by engaging clutch C accompanied by overrun at clutch B, the drive passing from pinion 11 through clutch C to gear 19 thence to sleeve 21 and shaft 17. When driving in second or fourth, first or third may be respectively obtained simply by releasing clutch C accompanied by speeding up the engine to engage clutch B.

Clutch C comprises a flux-conducting coil-receiving annular channeled electromagnet 27 which, in the illustrated type of transmission is carried by gear 19 and always rotating therewith, the electromagnet being disposed between gears 11 and 19. Welded or otherwise fixed to the outer annulus of electromagnet 27 is a forwardly projecting annular sleeve 28, of low permeability material, this sleeve having internal splines 29, for receiving the tongues 30 of the tin flux-conducting friction driven disks or elements 31. Between adjacent disks 31 there is a generally similar driving disk element 32, these disks terminating outwardly short of sleeve 28 and having inner tongues 33 for engagement with splines 34 of the rear extension 35 of pinion 11.

A magnetic pressure plate 36 is seated on extension 35 for movement toward electromagnet 27, the disks 31, 32 being disposed in closely associated relationship between plate 36 and electromagnet 27 so that when the electromagnet is energized, as will presently be apparent, the flux operates in a closed path or magnetic circuit around electromagnet 27, through disks 31, 32 and plate 36 such that the plate 36 and disks 31, 32 are drawn toward the electromagnet serving to frictionally pack the disks together and thereby drivingly connect pinion 11 with gear 19. A small portion of the flux in the aforesaid magnetic circuit is shunted at each disk 31, 32 but this is utilized to draw the disks together. To insure most of the flux following the complete circuit, each disk 31, 32 is formed with a plurality of axial slots 37 therethrough, these slots being registered with each other so that most of the flux is prevented from shunting through the disks and is made to travel through the prescribed circuit including plate 36. In order to disengage clutch C it is only necessary to de-energize the electromagnet 27.

Figures 2, 3:
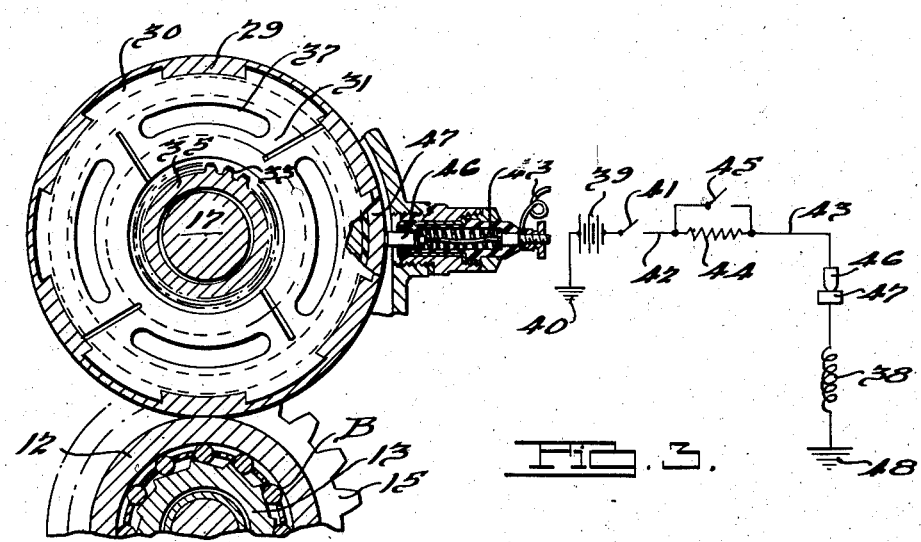
Fig. 2 is a detail sectional elevational view taken in accordance with line 2—2 of Fig. 1.
Fig. 3 is a wiring diagram.

In order to energize the electromagnet 27, I have provided a coil 38 disposed within the channel of the electromagnet for rotation therewith. Referring to Fig. 3 I have illustrated my control system comprising a source of energization as at storage battery 39 having a ground 40. From battery 39 the circuit extends through a switch 41, which may be operated by the vehicle driver, thence to a conductor 42. Two branches extend from this conductor to a conductor 43, one branch comprising a resistance 44 and the other branch comprising a second switch 45 likewise under control of the driver.

From conductor 43 the circuit extends through a brush 46 running on conductor slip ring 47 which is carried by sleeve 28 and thence through coil 38 to a ground 48 at the transmission.

For normal control of clutch C the switch 45 will remain open and switch 41 will be opened and closed to effect energization or de-energization of coil 38 and hence engagement or disengagement of clutch C. Coil 38 is so designed that it will provide sufficient magnetic flux to operate clutch C without danger of burning the coil, resistance 44 being in series with the coil. Thus, assuming a battery voltage of around 6 volts, the coil 38 would operate at approximately 3 amperes. However, if the battery voltage is sufficiently low, say around 3 volts for example, then the resulting amperage at coil 38 of around 1½ amperes would ordinarily be insufficient to engage clutch C and hence the engine could not be started by towing the car. At such times the driver need only to close switch 45 so as to shunt the resistance 44 and, with switch 41 closed, coil 38 would receive a normal 3 amperes instead of 1½ amperes. The foregoing figures are, of course, cited merely as illustrative and may vary according to the selection of battery, coil, resistance, and other parts. If the external resistance 44 is equal to the internal resistance of the coil 38, the clutch C may be fully engaged with one-half the normal desired battery voltage.

After the engine has been started and the system restored for normal operation, as by building up the voltage in battery 39 or by supply of adequate voltage by the usual generator, switch 45 may be opened and the system restored to normal control by switch 41 with resistance 44 once more in series with coil 38.

Switch 45 may, of course, be closed, to advantage at other times than when it is desired to drive shaft 10 from shaft 17, as when the voltage for any reason is inadequate to fully engage clutch C with the resistance operating in series with the coil.

The various electrical parts will, of course, be suitably electrically insulated so as to function as intended.

I claim:

1. A transmission for driving a motor vehicle comprising in combination a driving shaft adapted to receive drive from the engine, a driven shaft adapted to receive drive from the driving shaft for driving the vehicle, an electrically energizable clutch device adapted when energized to connect said shafts for drive transmission therebetween, a field coil for energizing said device, a storage battery, a resistance normally in series with said field coil during all energization of said device for driving said vehicle, circuit means including said coil, said resistance, and said battery, and driver controlled switch means for shunting said resistance out of said circuit means at the will of the driver upon abnormal drop in voltage of said battery to thereby provide the normally required energizing current in said coil to energize said device and connect said shafts for drive transmission therebetween and enable said vehicle engine to be started by towing said vehicle.

2. In a drive for a motor vehicle having an engine, a driving shaft adapted to be driven from the engine, a driven shaft adapted to be driven from said driving shaft for driving the vehicle, a clutch for controlling drive transmission between said shafts such that when said clutch is operative said shafts are drivingly connected and when said clutch is inoperative said shafts are drivingly disconnected, an electrically energizable field coil adapted to be energized for effecting said operation of said clutch, a source of electrical energy for said field coil comprising a storage battery, a resistance normally in series with said field coil for all operation of said clutch for driving said vehicle, electrical circuit means for said coil, battery, and resistance, and switch means positionable to shunt said resistance out of said circuit means, said battery having a voltage normally sufficient to provide required current for energization of said coil to effect operation of said clutch but being incapable of providing required current for effecting said operation of said clutch with said resistance in series with said coil as aforesaid upon an abnormal drop in voltage of said battery, said switch means being adapted to be so positioned as to normally maintain said series arrangement of said resistance and coil during all drive of the vehicle when the voltage of said battery is sufficient to effect said operation of said clutch, and said switch means being positionable at the will of the driver as to effect said shunting of said resistance when the voltage of said battery has dropped as aforesaid thereby to provide energizing current to said coil in amount sufficient to effect said operation of said clutch and enable drive of the engine for starting the same by towing the vehicle.

3. In a motor vehicle of the type equipped with a storage battery for supplying required energizing current to the coil of an electrically energizable clutch to obtain positive engagement of said clutch for controlling drive of the vehicle from the engine thereof, and having a resistance normally in series with said coil, the method of starting said engine under conditions of clutch failure due to abnormally low battery voltage, comprising, shunting said resistance out of the circuit between the battery and coil to thereby provide said coil with sufficient energizing current to enable positive engagement of said clutch and towing the vehicle with the clutch so engaged to turn the engine over.

4. A transmission for driving a motor vehicle comprising in combination a driving shaft adapted to receive drive from the engine, a driven shaft adapted to receive drive from the driving shaft for driving the vehicle, an electrically energizable device adapted when energized to connect said shafts for driving transmission therebetween, a field coil for energizing said device, a storage battery, a resistance normally in series with said field coil during all energization of said device for driving said vehicle, circuit means including said coil, said resistance, and said battery, and switch means operable to shunt said resistance out of said circuit means such that when the battery voltage drops abnormally then operation of said switch means will provide the normally required energizing current in said coil to energize said device and connect said shafts for drive transmission therebetween, and enable said vehicle engine to be started by towing said vehicle.

HENRY W. GILFILLAN.